United States Patent [19]

Hohage et al.

[11] Patent Number: 4,719,146

[45] Date of Patent: Jan. 12, 1988

[54] SCRATCH RESISTANT ANTIREFLECTIVE COATINGS FOR SYNTHETIC RESINS

[75] Inventors: Heinz-Jüergen Hohage, Muehltal; Rolf Neeb, Pfungstadt, both of Fed. Rep. of Germany

[73] Assignee: Röhm GmbH, Darmstadt, Fed. Rep. of Germany

[21] Appl. No.: 789,613

[22] Filed: Oct. 21, 1985

[30] Foreign Application Priority Data

Oct. 27, 1984 [DE] Fed. Rep. of Germany ....... 3439482

[51] Int. Cl.$^4$ ............................ B05D 7/02; C08J 7/04; C09D 3/82; G02B 1/10

[52] U.S. Cl. .................................. 428/331; 428/213; 428/334; 428/412; 524/493; 524/789; 524/853; 523/150

[58] Field of Search ............... 428/213, 331, 334, 412; 524/789, 853, 493; 523/150

[56] References Cited

U.S. PATENT DOCUMENTS

| Re. 32,152 | 5/1986 | Scher et al. | 428/331 |
|---|---|---|---|
| 2,432,484 | 12/1947 | Moulton | 88/1 |
| 3,324,055 | 6/1967 | Marks et al. | 260/17 |
| 3,451,838 | 6/1969 | Burzynski et al. | 117/33.3 |
| 3,484,157 | 12/1969 | Crandon et al. | 351/166 |
| 3,700,487 | 10/1972 | Crandon | 117/72 |
| 3,707,397 | 12/1972 | Gagnon | 117/72 |
| 3,766,299 | 10/1973 | Dornte | 260/874 |
| 3,843,390 | 10/1974 | Hudson et al. | 117/138.8 F |
| 3,862,261 | 1/1975 | Stoddard | 260/849 |
| 3,986,997 | 10/1976 | Clark | 260/29.2 M |
| 4,110,300 | 8/1978 | Matsushita | 524/424 |
| 4,159,206 | 6/1979 | Armbruster et al. | 106/287.12 |
| 4,170,690 | 10/1979 | Armbruster et al. | 428/447 |
| 4,196,246 | 4/1980 | Takayama et al. | 428/213 |
| 4,196,273 | 4/1980 | Imai et al. | 524/862 |
| 4,251,576 | 2/1981 | Osborn et al. | 428/331 |
| 4,287,114 | 9/1981 | Itoh et al. | 524/493 |
| 4,310,600 | 1/1982 | Cross | 428/331 |
| 4,311,738 | 1/1982 | Chi | 428/450 |
| 4,330,446 | 5/1982 | Miyosawa | 523/409 |
| 4,390,373 | 6/1983 | White et al. | 428/412 |
| 4,442,177 | 4/1984 | Noda et al. | 428/412 |
| 4,460,637 | 6/1984 | Mimaymoto et al. | 428/331 |
| 4,482,591 | 11/1984 | Ward | 428/66 |
| 4,499,231 | 2/1985 | Ward et al. | 524/506 |
| 4,539,351 | 9/1985 | O'Malley et al. | 523/150 |
| 4,544,604 | 10/1985 | Usui et al. | 428/331 |
| 4,557,980 | 12/1985 | Hodnett | 428/334 |
| 4,560,719 | 12/1985 | Nakamura et al. | 524/412 |
| 4,618,518 | 10/1986 | Pricone et al. | 428/331 |
| 4,618,639 | 10/1986 | Takahashi et al. | 524/860 |
| 4,618,646 | 10/1986 | Takago et al. | 524/860 |

FOREIGN PATENT DOCUMENTS

| 821402 | 4/1975 | Belgium . | |
|---|---|---|---|
| 1011032 | 5/1977 | Canada . | |
| 38640 | 10/1981 | European Pat. Off. . | |
| 2454076 | 5/1975 | Fed. Rep. of Germany . | |
| 2732753 | 1/1978 | Fed. Rep. of Germany . | |
| 0005742 | 1/1982 | Japan | 524/853 |
| 6608316 | 12/1966 | Netherlands . | |
| 703500 | 5/1970 | South Africa . | |
| 1308697 | 2/1973 | United Kingdom . | |
| 1417502 | 12/1975 | United Kingdom . | |
| 1441868 | 7/1976 | United Kingdom . | |
| 1541672 | 3/1979 | United Kingdom . | |
| 1543364 | 4/1979 | United Kingdom . | |

OTHER PUBLICATIONS

Chem. Abstr. 93, 172530j, Suwa Seikosha Co. Ltd., J8052001 Apr. 16, 1980.
Chem. Abstr. 99, 123818z, Konishiroku Photo Apr. 11, 1983, JP5860701.
Chem. Abstr. 93, 9663w, Jan. 28, 1980 Takagi et al, JP8012107.
Chem. Abstr. 81, 154763k, Kamimori et al, J7431767, 3-22-74.
Chem. Abstr. 99, 55165g, JP5842001 Daicel Mar. 11, 1983.
Chem. Abstr. 99, 39517t, Suwa Seikosha Co., J5821701, 2-8-83.
DIN 53194, Apr. 1975 (2 pages).

*Primary Examiner*—Herbert J. Lilling
*Attorney, Agent, or Firm*—Curtis, Morris & Safford

[57] ABSTRACT

Scratch resistant and antireflective coatings for synthetic resins, said coatings having a refractive index differing from the value 1.45 by at least 0.01 unit and a thickness ranging from 1 to 40 microns and comprising
(1) (a) an acrylate and/or methacrylate polymer, and/or
(b) an organosilicon polymer, or
(c) a melamine resin; and
(2) from 0.1 to 10 weight percent of amorphous, porous silicic acid having a large pore volume from 0.1 to 5 ml/g and consisting of primary particles of an average diameter ranging from 1 to 50 microns;

synthetic resin substrates having such a coating thereon; coating compositions for applying such a coating to a substrate; and methods for making such coatings.

11 Claims, No Drawings

SCRATCH RESISTANT ANTIREFLECTIVE COATINGS FOR SYNTHETIC RESINS

The present invention relates to scratch resistant coatings which do not reflect incident light, or reflect it only slightly, for use on synthetic resins, particularly transparent synthetic resins; to resin substrates having such coatings thereon; to coating compositions for providing synthetic resin substrates with such coatings; and to methods for coating substrates with such compositions.

A number of synthetic resins have been developed which on the whole meet practical requirements except that they lack adequate surface hardness or scratch resistance. Synthetic resins (plastics), or course, do not possess the surface hardness and scratch resistance of most metals or of inorganic glasses. The susceptibility of transparent resins to being scratched, which may result in cracking, is particularly detrimental.

There have therefore been many attempts to render the surface of synthetic resins resistant to scratching, and so many processes and variants have been proposed to that end that they are difficult to survey. The coating materials proposed have been primarily curable synthetic resins, preferred according to their compatibility. These include polyvinyl aldehydes or polyvinyl esters with a dialdehyde (cf. U.S. Pat. No. 3,484,157), polyurethanes (cf. published German patent application DOS No. 26 11 782), alkyl titanate (cf. U.S. Pat. No. 3,700,487), or melamine in the most different variations, including melamine polyol (for example British patent No. 1,308,697 and U.S. Pat. No. 3,862,261).

Moreover, a wide variety of acrylic resins (cf. published German patent application DOS No. 23 17 874); fluorinated hydrocarbons in a great many combinations and modifications (cf. published Netherlands patent application NL-OS No. 6608 316 and published German patent applications DE-OS No. 19 63 278 and DE-OS No. 24 54 076); crosslinked polyalkylene imine compounds (cf. U.S. Pat. No. 3,766,299); and silicon compounds, and particularly silicone resins (cf. Belgian patent No. 821,403 and U.S. Pat. Nos. 3,451,838 and 3,707,397) have been proposed for use as coatings.

The requirement to render synthetic resins, especially transparent resins, scratch resistant is frequently coupled with a further requirement, namely to provide the resins with so-called antireflecting coatings which practically do not reflect incident light, or if so then only very slightly.

It is obvious to seek to achieve scratch resistance and an antireflecting effect with a surface coating. Nearly all types of synthetic resins, and particularly the transparent plastics, are suitable for use as substrates for such coatings. They include the acrylic resins, and particularly those comprising polymethyl methacrylate; polycarbonate; polystyrene; polyvinyl toluene and other vinyl resins; methylpentene polymers; polysulfones; cellulose derivatives; fluorinated polymers; polyurethanes; and silicones.

For example, colloidal silica in the form of a sol in water or in another appropriate solvent such as ethylene glycol monoethyl ether or in a mixture of solvents has long been used (cf. U.S. Pat. No. 2,432,484). In colloidal systems, the particle size is necessarily in the micron range to render the coating more abrasion resistant and less sensitive to contact, a second coating may be deposited on the colloidal material as a binder. A dilute solution of tetraethyl orthosilicate in an organic solvent such as alcohol denatured with ethyl acetate and containing a little hydrogen chloride is used as a binder.

U.S. Pat. No. 3,986,987 describes unpigmented aqueous coating compositions comprising a silanol condensate and silica, consisting of a dispersion of colloidal $SiO_2$ in a solution of a partial condensate of an alkylsilanol. The $SiO_2$ content is said to range from 10 to 70 weight percent of the solids content.

Similarly, German patent publication DE-AS No. 28 11 072 describes coating materials containing from 30 to 50 weight percent of colloidal silicic acid and from 50 to 70 weight percent of siloxane.

A coating composition formed of partially hydrolyzed ethyl orthosilicate, polyvinyl acetate, polyvinyl formal, silica, and methyl methacrylate in an alkaline solution is described in U.S. Pat. No. 3,324,055.

In Japanese patent No. 74 31 767 (Chem. Abstr. 81, 154763), a silica film is deposited on a substrate in vacuum, treated with steam, and then coated with fluorinated alkylsiloxane.

German patent publication DE-AS No. 27 28 127 proposes an antireflecting coating for a plastic substrate, such as a polycarbonate, which consists of a first layer of silica that is vapor deposited on the substrate in a thickness ranging from 1 to 5 microns, a second layer of alumina vapor deposited on the first layer in an optical thickness of $\lambda/4$, and a third layer of silica or magnesium fluoride vapor deposited on the second layer in an optical thickness of $\lambda/4$.

Japanese patent No. 55 052 001 (Chem. Abstr. 93, 172530) proposes antireflective films of silica or zirconia for optical parts made of a transparent synthetic resin (for example polycarbonate or polymethyl methacrylate). An antireflective coating for optical elements made of synthetic resins is also known from Japanese patent No. 58 42 001 (Chem. Abstr. 99, 55165g). There, a layer of a condensate of partially hydrolyzed alkyltrialkoxysilane is first applied to the surface of the optical elements. At least one layer, $\lambda/2$ or $\lambda/4$ thick, of silica, alumina, ceria and/or thoria is then vapor deposited onto the first layer. ($\lambda=400$ to 700 nm.)

Japanese patent No. 58 60701 (Chem. Abstr. 99, 123818z) relates to the antireflective coating of plastic lenses. There, the lens surface is repeatedly coated with silica in a vacuum in such a way that layers with different refractive indices are formed.

According to Japanese patent No. 58 21701 (Chem. Abstr. 99, 39517t), light weight lenses with a high refractive index, low reflectivity, and high resistance to scratching are produced by providing molded blanks made of special polymers with a refractive index $n_D{}^{20}$ between 1.55 and 1.65 first with a melamine resin layer and then applying to the latter a surface film of silica, zirconia, yttria, ytterbia, alumina, or other inorganic compounds.

Japanese patent No. 80 12107 (Chem. Abstr. 93, 9663w) relates to matte coatings for plastics having high resistance to scratching. The coating material consists of silicone, silica, and polyvinyl butyral. The ratio between silica and silicone should be between 0.1 and 2 and the ratio between the silicon compounds and polyvinyl butyral between 0.005 and 0.05. Polymethyl methacrylate coated with this material is semitransparent. Writing applied with a marking pencil can readily be wiped off.

These prior art coating materials have not always proved satisfactory. What has been lacking, for example, is coatings, especially for synthetic resins, which are sufficiently scratch resistant and which adequately prevent or reduce the reflection of incident light without, of course, impairing the properties of the resins. The evaporative deposition of oxides such as silica, alumina, etc., in a vacuum, sometimes in repeated operations, is a relatively complicated procedure. When silicic acid is deposited as a colloidal dispersion, crystal clear coatings which have no antireflective properties are usually obtained.

Thus there has been a need for a less complicated process for providing substrates with scratch resistant antireflective coatings, preferably by the use of conventional scratch resistant coating materials and of the existing technical know-how in the procedure and application of these materials.

According to the present invention, a method for coating synthetic resin substrates with coating compositions to give coatings having scratch resistant and antireflective properties has now been developed which largely satisfies practical requirements. Said coatings have a refractive index differing from the value 1.45 by at least 0.01 unit, a thickness ranging from 1 to 40 microns, and comprise (1) (a) an acrylate and/or methacrylate polymer, and/or (b) an organosilicon polymer, or (c) a melamine resin; and (2) from 0.1 to 10 percent of an amorphous, porous silica, with or without a treated surface, having a large pore volume from 0.1 to 5 ml/g and consisting of primary particles of an average diameter ranging from 1 to 50 microns, suitably having a packed density (in conformity with DIN 53 194) ranging from 120 to 350 g/l.

The silicic acid to be used in accordance with the invention is an amorphous, porous silicic acid, for example a precipitated silicic acid that is a silicic acid produced by the wet chemical route, in other words by precipitation. Such precipitated silicic acids can be produced by reacting an aqueous alkali metal silicate solution with mineral acids. (cf. Ullmanns *Enzyklopadie der technischen Chemie*, 4th Ed., Vol. 21, pp. 465–470; Verlag Chemie.)

The primary particles of the silicic acid generally have an average particle size ranging from 1 to 20 microns. The silica preferably has a specific surface area ranging from 90 to 900 m²/g, and more preferably has a specific surface area ranging from 300 to 900 m²/g. Thus, in contrast to the prior art, the invention does not make use of silicic acid in colloidal form.

Before being introduced into the coatings of the invention, the silicic acid particles themselves may be organically coated. In some cases, it will be advantageous to first prepare a paste from the coating material and the silicic acid, which paste is subsequently brought into a form preferred for use, for example diluted with an appropriate inert solvent to give coating compositions suitable for spraying or some other form of application.

A first class of materials for coating the silicic acid particles includes (1)(a) acrylate and methacrylate polymers, preferably UV-curable polymers containing crosslinking monomers. The latter as usual have at least two polymerizable units, such as vinyl groups, per molecule. (cf. Brandrup-Immergut, *Polymer Handbook*.) Examples are the diesters and higher esters, with acrylic acid or with methacrylic acid, of polyhydric alcohols such as glycol, glycerol, trimethylolethane, trimethylolpropane, pentaerythritol, diglycerol, ditrimethylolpropane, ditrimethylolethane, dipentaerythritol, trimethyl-1,6-hexanediol, and 1,4-cyclohexanediol.

Illustrative of such crosslinking monomers are methylene diacrylate and dimethacrylate, ethylene glycol diacrylate and dimethacrylate, propylene glycol diacrylate and dimethacrylate, 1,3-butanediol diacrylate and dimethacrylate, 1,4-butanediol diacrylate, and dimethacrylate, neopentyl glycol diacrylate and dimethacrylate, diethylene glycol diacrylate and dimethacrylate, 4-thia-2,6-heptanediol diacrylate and dimethacrylate, tetramethylene glycol diacrylate and dimethacrylate, pentanediol diacrylate and dimethacrylate, hexanediol diacrylate and dimethylacrylate, ditrimethylolpropane tetraacrylate and tetramethacrylate, and dipentaerythritol hexacrylate and tetramethacrylate.

Particularly interesting acrylate and methacrylate polymers preferably contain esters formed between acrylic acid and methacrylic acid and polyvalent alcohols of the formula

wherein $R^1$–$R^4$ are the same or different and are hydrogen, methyl, ethyl, —OH, —CH$_2$OH, or —C$_2$H$_5$OH, but wherein such compounds contain at least two —OH groups per molecule present on different carbon atoms thereof, as well as such alcohols as are derived from the polyhydroxy alcohols of the aforementioned formula by the cleavage of water therefrom, but which still contain at least two hydroxy groups. Esters of these types are present in the polymer in amounts of from 40 to 100 percent by weight thereof, preferably in amounts from 80 to 100 percent.

Also preferred are polymers comprising acrylate and methacrylate esters of the formula

wherein $R^5$ is hydrogen or methyl and $R^6$ is an aliphatic, alicyclic, or araliphatic alcohol having 1 to 10 carbon atoms, preferably 1 to 6 carbon atoms. Groups $R^6$ are preferably hydrocarbons, but the aliphatic materials may suitably comprise epoxy groups therein. These esters are suitably present in amounts from 0 to 60 percent by weight of the polymers, preferably 0 to 20 percent.

Such polymers are described in German patent No. 21 64 716. The coating material consists of a homopolymer or copolymer which contains, incorporated by polymerization, not less than 40 percent by weight of units of at least one ester having at least three acryloxy or methacryloxy groups per molecule of trimethylolethane, trimethylolpropane, pentaerythritol, or dipentaerythritol and not more than 60 percent by weight of units of ethylenically mono- or di-unsaturated monomers which are copolymerizable therewith.

Coating materials consistent with the teaching of German patent No. 21 64 716 can be used in the present invention. Also usable within the meaning of the present invention are the coating compositions described in U.S. Pat. Nos. 3,097,106, 2,997,745 and 2,320,536, Japanese patent publications Nos. 17 847/60 and 10 676/71, 147 675/77 (Chem. Abstr. 88, 172014r) and 25 354/78 (Chem. Abstr. 89, 148289), published German patent application DE-OS No. 28 07 605, and Japanese patent No. 78 102936 (Chem. Abstr. 90, 24897g).

Moreover, polyfunctional compounds according to published German patent application DE-OS No. 24 55 715 which contain at least 30 percent by weight of at least one polyfunctional compound, such as a polymethacryloxy compound with at least three methacryloyloxy groups per molecule and a molecular weight between 250 and 800 and/or a polyacryloxy compound with at least three acryloyloxy groups per molecule and a molecular weight between 250 and 800, as well as a fluorine-containing surfactant, may be used as a coating for silicic acid within the meaning of the present invention.

In addition to said crosslinkers, suitable monomers susceptible to free radical polymerization include acrylates and methacrylates having from 1 to 10 carbon atoms in the alcohol portion thereof, such as methyl acrylate and methacrylate, ethyl acrylate and methacrylate, butyl acrylate and methacrylate, propyl acrylate and methacrylate, 2-ethylhexyl acrylate and methacrylate, hexyl acrylate and methacrylate, cyclohexyl acrylate and methacrylate, benzyl acrylate and methacrylate, and glycidyl acrylate and methacrylate, as well as acrylic and methacrylic acids.

These coating materials (1)(a) preferably have a molecular weight ranging from 250 to 800 prior to crosslinking. The acrylate and methacrylate polymers may further contain polymers of other types, for example the organosilicon polymers and melamine resins described further below.

For hardening such materials, a mixture of the hardenable monomers is first prepared, to which are added the optional non-polyfunctional monomer compounds (Formula II) earlier described, for instance to achieve a viscosity suitable for working. However, the viscosities of the mixtures may not be so high that the resulting masses cannot be applied to the surface of a substrate within the times available for industrial working, generally within a range of minutes. This criterion is particularly pertinent if the material is to be applied to a surface by knife coating or with a brush. In these cases, the viscosity is suitably between 100 and 3000 mPa.s.

On the other hand, the viscosity should not be so low that specified layer thicknesses cannot be attained if application is by immersion or spraying. In these cases, the viscosity is more advantageously lower by about a factor of 10 than when application is by spreading the material on a surface.

Next, an appropriate hardener is added to the monomers if hardening is to be carried out by ultra-violet radiation. Suitable hardeners are known in the art, and are particularly aromatic compounds which can be excited with ultra-violet, for example keto compounds such as benzoinisopropyl-ether, the condensation product of acetone and benzaldehyde, benzildialkylketals, and the like.

Such hardeners are usually used in amounts of 1 to 10 percent, by weight of the monomers.

Mercury vapor lamps (high pressure or medium pressure) having quartz or "Vicor" windows are usually used as a UV source. The energy normally used to drive the lamps is between 40 and 160 watts per centimeter of arc. Principal bands are at 365, 404, 436, 546, and 578 nanometers. Generally, energy input into the sample over a period of seconds, perferably from 1 to 10 seconds, is sufficient for hardening. The sample is usually at a distance of 10 centimeters from the UV source. (For further discussion of such hardening processes see Kirk-Othmer, Vol. 19, pgs. 607–624, J. Wiley and Sons, 1982).

Measurements of the antireflecting effect of such coating are made according to ASTM-D 1003.

$T_D$ (=turbidity)-values between 2 and 7 percent and $T_2$ (=transmission)-values from 92 to 95 percent, preferably from 94–95 percent, are obtained on synthetic resin substrates coated with antireflective coatings according to the present invention with layer thicknesses between 1 and 40 microns.

In addition to UV-hardening, classic free radical-induced hardening using so-called thermal initiators is also possible. In this case, known peroxidic or azo initiators are employed instead of the aforementioned UV hardeners, for example azoisobutyronitrile, dibenzoylperoxide, dilaurolyperoxide, etc. (cf. H. Rauch-Puntigam et al., *Acryl- und Methacrylverbindungen*, pgs. 160–165, Springer Verlag, 1967). The content of such peroxidic and azo initiators is 0.02–5 percent, by weight of the monomers. Here too, hardening times are measured in seconds, for example from 1 to 10 seconds.

A further class (1)(b) of coating materials for use in the invention, silicon polymers, are the organosilicon compounds known from the prior art, such as alkyltrialkoxysilanes, dialkyldialkoxysilanes, and tetraalkoxysilanes, the similarly used aromatically substituted organosilicon compounds. Illustrative of these are the compounds of the formula

 (III)

wherein $R^7$, $R^8$ and $R^9$ are, independently of one another, a $-(O)_n R^{11}$ group, $R^{10}$ and $R^{11}$ being alkyl having from 1 to 4 carbon atoms, or vinyl, allyl, or phenyl, preferably methyl or ethyl, and n is 0 or 1; or $R^{10}$ and/or $R^{11}$ are

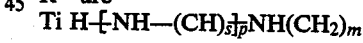

m and s each being an integer from 1 to 6, and p being 0 or 1; or $R^{10}$ and $R^{11}$ are

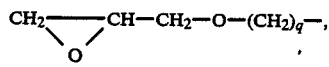

where q is an integer from 1 to 6; or $R^{10}$ and/or $R^{11}$ are

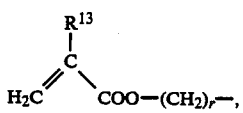

wherein $R^{13}$ is hydrogen or methyl and r is an integer from 1 to 6. Preferably, n has a zero value in at least one of groups $R^7$, $R^8$, or $R^9$.

The aqueous coating compositions are preferably prepared by hydrolyzing the organosilicon compounds, and particularly the compounds of formula (III), with an amount of water sufficient for hydrolysis, that is 0.5 or more mole of water per mole of the groups intended for hydrolysis, for example alkoxy groups, preferably with acid catalysis. As acids, inorganic acids such as hydrochloric acid, sulfuric acid, phosphoric acid, nitric acid, etc., or organic acids such as carboxylic acids, organic sulfonic acids, etc., or acid ion exchangers may be added, the pH of the hydrolysis reaction usually being between 2 and 4.5, and preferably being 3.

The temperature will generally rise after the reactants have been combined. In some cases it may be necessary to supply external heat to initiate the reaction, for example by heating the batch from 40° C. to 50° C. It will be advisable to see to it that the reaction temperature does not exceed 53° C. As a rule, the reaction time will be relatively short, usually less than one hour, for example 45 minutes. For further treatment, a portion of the water/alcohol mixture and of volatile acids is advantageously distilled off in a vacuum. The solids content can then be adjusted to about 15 to 35 weight percent with appropriate organic solvents, for example alcohols such as ethanol, methanol, isopropanol, or butanol; ethers such as diethyl ether or dioxane; ethers and esters of polyols such as ethylene glycol or propylene glycol as well as ether-esters of these compounds; hydrocarbons such as aromatic hydrocarbons; or ketones such as acetone or methyl ethyl ketone. 2-propanol is particularly preferred as a solvent.

To provide compositions to be used for coating, it has further proved advantageous to add a solvent or solvents which normally partially dissolve the synthetic resin serving as the substrate to be coated. For example, when the substrate is polymethyl methacrylate (PMMA), the addition of a solvent such as toluene, acetone, or tetrahydrofuran in an amount from 2 to 20 percent, based on the total weight of the composition, is recommended. The water content of the inventive coating compositions should generally be kept from 5 to 20 weight percent and preferably to $13\pm 2$ weight percent, based on the total weight of the compositions.

The pH value of the aqueous coating compositions containing resins (1)(b) should be between 3 and 6, and preferably between 4.5 and 5.5. It has been found that condensation during storage is particularly low within this range. The pH range can be adjusted conventionally, for example by adding appropriate bases such as an hydroxide of an alkali metal or alkaline earth metal, or ammonium hydroxide, optionally in an alcoholic solution, or with appropriate salts of weak acids such as carbonates or acetates. The use of buffer systems within said pH range, for example of an acetic acid/potassium hydroxide buffer solution, is recommended. An embodiment wherein higher carboxylic acids, and particularly carboxylic acids having from 8 to 12 carbon atoms, are contained in the coating composition in an amount from 0.01 to 1 mole of acid per mole of the hydrolyzable organosilicon compounds, such as the compounds of formula (III), is highly advantageous.

Curing agents in the form of zinc compounds, usually salts, for example, and/or of other metal compounds such as cobalt, copper, or calcium compounds, and particularly their salts with organic acids, such as the octoates or naphthenates, are advantageously added to the coating compositions of the invention containing resins of the (1)(b) type. The amount of these curing agents generally ranges from 0.1 to 2.5 weight percent, and more particularly from 0.2 to 2 weight percent, based on the total coating composition. Zinc naphthenate, octoate, acetate, sulfate, etc., are particularly well suited.

The use of organosilicon coating materials of this kind in the form of the formulations described in U.S. Pat. No. 4,455,403 is highly preferred. This patent teaches coating compositions having improved storage stability which are prepared by the condensation of partially hydrolyzed organosilicon compounds in the presence of acids, whereby the coating compositions contain acyclic alkanecarboxylic acids having from 6 to 21 carbon atoms, and more particularly 8 carbon atoms, per molecule.

If the higher carboxylic acids as defined above are not already added for the purpose of hydrolysis of the silanes, one or more higher carboxylic acids are added to the coating composition prior to its storage in such an amount that there will be from 0.05 to 0.2 mole, and preferably from 0.1 to 0.15 mole, of the higher carboxylic acid per mole of silane used. Moreover, it will be advantageous to make use of the teaching of U.S. Pat. No. 4,495,322 (especially in combination with the teaching of U.S. Pat. No. 4,455,403). That is, such coatings comprising a silicone resin also contain an amide of the formula

(IV)

or mixture of such amides, wherein $R^{14}$ is hydrogen, linear or branched alkyl having from 1 to 22 carbon atoms, and more particularly $C_1$-$C_6$ and $C_{12}$-$C_{18}$ alkyl, especially the straight chain alkyl groups, or is optionally substituted phenyl or —$OR^{17}$ alkoxy wherein $R^{17}$ is alkyl having from 1 to 18 carbon atoms or optionally substituted phenyl or naphthyl, or —$N^{15'} R^{16'}$ wherein $R^{15'}$ and $R^{16'}$ may have the same meanings as $R^{15}$ and $R^{16}$ but are independent therefrom, and wherein $R^{15}$ and $R^{16}$ are, independently of each other, hydrogen or alkyl having from 1 to 4 carbon atoms, or wherein $R^{15}$ and $R^{16}$ or $R^{14}$ and $R^{16}$, together with the nitrogen atom or nitrogen and carbon atoms to which they are bound form a five-, six-, or seven-membered heterocycle which may have further nitrogen or oxygen atoms in the ring, or contain mixtures thereof.

Substituents on the aforementioned phenyl group may be, in particular, nitro, alkyl, alkoxy, hydroxyl, amino, sulfonic acid, halogen, or further phenyl groups, with the total number of carbon atoms in the substituents generally not exceeding 22. The amino groups in turn may be substituted and in particular alkylated.

Particularly preferred are the compounds of general formula (IV) wherein $R^{14}$ is hydrogen, methyl, ethyl, propyl, butyl, pentyl, or hexyl, including the isomers, preferably the linear compounds, and wherein $R^{15}$ and $R^{16}$ are hydrogen, methyl, or ethyl, and the compounds wherein $R^{14}$ is ethoxy and $R^{15}$ and $R^{16}$ are hydrogen, methyl, or ethyl.

Illustrative of these are formamide, dimethylformamide, acetamide, dimethylacetamide, and propionamide, and particularly acetamide, propionamide, and n-butyramide, as well as ethyl carbamate and N-ethyl carbamic acid ethyl ester. Amides which can be used to further advantage include methyl formamide, diethyl formamide, isobutyramide, pivalamide, stearamide, etc.

The morpholinides and piperidides are also included within the $R^{14}$ CO- groups covered by the invention.

The amount of amides of formula (IV) to be added in accordance with U.S. Pat. No. 4,495,322 cited should range from 1 to 20 percent, and more particularly from 3 to 10 percent, and preferably is $5\pm 1$ percent, based on the total weight of the coating composition. The water content of the coating composition usually ranges from 5 to 20 percent, and more particularly from 10 to 15 percent by weight, and preferably is $13\pm 1$ percent, based on weight of the total coating composition. The amides of formula (IV) can be added to the coating compositions already during the preparation of the condensation products from partially hydrolyzed organosilicon compounds, but are preferably added to the compositions which already contain the condensation resins in a carrier phase. The addition can be made conventionally, preferably by admixing, optionally together with other solvents.

The coating compositions so obtained exhibit excellent curing characteristics in addition to outstanding storage stability. For example, they can be cured in a relatively short time, over a period of from 4 to 6 hours, and usually within about 5 hours, and at a relatively low temperature, for example between 90° C. and 110° C. and preferably at about 100° C., into highly scratch resistant and firmly adhering coatings. Through the process of the invention, antireflecting properties are additionally imparted to the substrates so coated.

A third and last class (1)(c) of coating materials, the melamine resins, are the known condensation resins built up from melamine-aldehyde polymers in soluble form and from their alkylated derivatives. [See Ullmanns *Enzyklopadie der technischen Chemie*, 3d Ed. Vol. 7, pp. 403–424; Verlag Chemie, Weinheim, and Kirk-Othmer, 3d Ed., Vol. 2, pgs. 440–469, J. Wiley and Sons (1978).]

More particularly, they are the curable formaldehyde condensation products comprising melamines and the ethers formed by etherification of the methylol compounds with alcohols or polyols.

As a rule, relatively low molecular weight precondensates having a relative molecular weight ranging from 500 to 17000, and preferably from 600 to 14000 are used.

Etherification is carried out conventionally, preferably at elevated temperature, in the presence of acids. The mono- to hexa-alkyl ethers of the $C_1$ to $C_4$ alcohols are relatively easy to prepare, whereas the introduction of higher alcohols is mostly accomplished by ether interchange. Partially etherified products are also of importance.

The hexakis ($C_1$–$C_6$-alkoxymethyl) melamines and the benzyl ethers, especially the methyl, n-butoxy, and isobutoxy ethers are particularly suitable. Modification with capryl alcohol is also of interest. Suitable solvents for the melamine compounds are alcohols such as the ethylene glycols corresponding to the ether, ethyl Cellosolve, toluene, xylene, and mixtures thereof. Small amounts of water may be present. As a rule, the solids content ranges from 10 to 80 percent and preferably is $60\pm 20$ percent by weight.

Reaction products of the melamine condensation polymers with polyols, suitable for use according to the invention, include those with glycol, glycerol, 1,4-butanediol, trimethylolpropane, pentaerythritol, and polyethylene glycols and polyester polyols, especially the aliphatic ones. Following preparation or alkylation, the liquid components can be eliminated to concentrate the remainder and the pH can be adjusted to a value between 7 and 10 to improve pot life.

The usual stabilizers or modifiers may be used, and particularly amines, for example alkanolamines such as 2-amino-2-methyl-1-propanol or dimethylaminoethanol, triethylamine and the like, as well as furfural, polyamines, and sugar, in amounts of under 10 percent by weight. Moreover, the melamine resins may be used in combination with other polymers which are suitable as components in scratch resistant coatings, for example polyurethanes, the silicone resins earlier described herein as (1)(b), or the acrylic resins earlier described as (1)(a).

Heat curing of the coatings containing melamine resins (1)(c) is usually carried out at temperatures ranging from 60° C. to 185° C., and preferably from 110° C. to 175° C., for from 0.5 to 45 minutes. (See G. Widmer in H. Mark et al., *Encyclopedia of Polymer Science and Technology* 2, p. 47 et seq.; Interscience.)

Acids, for example organic acids such as acetic acid, propionic acid, and para-toluenesulfonic acid, and their anhydrides, may be used as usual as curing agents for these coatings in the amounts in which they are commonly employed, generally under 10 weight percent based on the melamine component.

The actual practice of the method of the invention may be carried out on the same principles, substantially independently of the chemical nature of the coating composition.

Introduction of Silica into the Coating Composition

The silica (2) to be used in accordance with the invention, specifically in the form of amorphous, porous silicic acid, is uniformly dispersed in a liquid coating composition containing one of the three coating materials (1)(a)–(b) earlier described, usually mechanically, for example by means of a stirrer.

Advantageously, a paste is first prepared from the coating material by adding the silica. For application to a substrate, the paste can then be diluted in an appropriate manner, for example by adding a suitable inert solvent. In the case of the organosilicon polymer coating materials (1)(b), suitable alkanols, and in particular a mixture of alkanols such as a mixture of n-butanol, isopropanol, and n-hexanol, may be used for dilution.

By introducing the paste into the coating composition, diluted by the addition of a solvent, with stirring, for example in a simple agitator, a coating composition that can be sprayed is obtained.

The coating compositions according to the invention are suitable for solid resin surfaces, such as glasslike substrates, and particularly for polymeric synthetic resins comprising acrylic resins, such as polymethyl methacrylate and its various modifications; ABS; polycarbonates; polyesters; polyamides; melamine-formaldehyde resins; polystyrene; polyvinyl chloride; polyolefins such as polyethylene; polypropylene; and polytetrafluoroethylene; allyl diglycol carbonate; and cellulose acetate.

The proper coating weight depends to some extent on the substrate to be coated and on the coating composition. The coating weight, expressed as dry weight, generally is between 2 and 6 $g/m^2$ and the thickness of the coating usually ranges from 1 to 40 microns. At least 40 percent, and preferably at least 50 percent, of the primary silica particles should, in a particular case, have an average diameter that is at least 10 percent, and preferably at least 15 percent, greater than the coating thickness.

The substrates may be coated, for example, by dipping and controlled withdrawal of the coated surfaces from a coating solution. Withdrawal may be carried out at a rate from 10 to 40 cm/min.

Another appropriate coating method is spray coating. Flow coating and fluidized bed coating may also be employed.

The substrates so coated are then appropriately cured. In the case of the organosilicon coatings this is preferably done by exposure to elevated temperatures, generally between 80° C. and 100° C., for from 2 to 6 hours, and preferably for about 5 hours, in a drying oven. In the case of the melamine resin coating materials curing is also carried out by exposure to elevated temperatures in the range from 60° C. to 185° C., and preferably from 110° C. to 175° C., for a period from 0.5 to 45 minutes. Still another way of performing the method of the invention is to first coat two glass plates with an UV-curable resin as described above by means of a doctors blade, then cure the resin as described. Then the coated glass plates are used for constructing a chamber, in which PMMA is polymerized as known in the art, and exposed to an elevated temperature e.g. above 90° C. up to 130° C. for at least one and up to four hours. The glass plates are removed after cooling without any problems. The PMMA thus produced has a scratch resistant antireflective coating.

The examples which follow will serve to illustrate the invention. Unless otherwise indicated, the percentages given are percentages by weight.

The packed density of the silicic acid used is in the 250±100 g/l range, in conformity with DIN 53194. The BET (Brunauer/Emmet/Teller) surface area is dertermined as described by Meffert & Langenfeld, Z. Anal. Chem. 238, 187–193 (1968).

EXAMPLE 1

0.3 percent of amorphous silicic acid having a pore volume of 1.8 mg/l an average particle size of 3 microns and a BET surface area of 400 m²/g (for example, "Syloid ED 30", a product of Grace Chemicals) is suspended in a UV-curable coating composition composed of 75 percent of trimethylolpropane triacrylate, 20 percent of pentaerythritol tetraacrylate, and 5 percent of a curing agent (benzil dimethylketal).

Two glass plates (200×200 mm) are knife coated with the coating solution and cured for 5 seconds by means of a high pressure mercury vapor lamp at a distance of 10 cm. In a chamber formed by these glass plates, methyl methacrylate is then conventionally polymerized, following which it is exposed to a temperature of 115° C. for 2 hr. After cooling, the glass plates can be readily removed. The PMMA remaining is now provided with a scratch resistant, firmly adhering coating which is only slightly reflective.

Preparation of Silicone Resin Coating Solution 1000 g of methyltriethoxysilane are hydrolyzed with 454 g of water and 50 g of glacial acetic acid. The temperature is held below 50° C. After ¾ hr., 865 g of ethanol/water mixture is distilled off in a vacuum and the residue is diluted with 555 g of isopropyl alcohol and 57 g of toluene. 6.3 g of zinc octoate are added as curing agent.

For adjustment of the pH value, 25 g of a 3.5 percent of methanolic KOH solution and 75 g of propionamide are added. The water content is then adjusted to 13 percent.

(a) Batch Preparation of a Silicon Dioxide Dispersion 20 g of amorphous silicic acid having a pore volume of 1.6 ml/g, a mean particle size of 2 microns, and a BET-surface area of 400 m²/g (e.g. "Syloid 244", Grace Chemicals) are dispersed using a dissolver stirring device for viscous solutions c.f. Ullmann's Encyclopädie der Techn. Chemie 4th Ed., Vol. 2, pp 287–288, Verlag Chemie, in 100 g of a solvent mixture of 1-hexanol, 1-butanol, and 2-propanol (2:1:1).

(b) Antireflective Silicone Paint

The silicon resin coating material described above is diluted with 16.5 or alternatively 20.0 percent of 1-hexanol
8.5 or alternatively 10.0 percent of 1-butanol
8.5 or alternatively 10.0 percent of 2-propanol and then 0.1 to 1.6 percent of the silicon dioxide dispersion described in (a) above is stirred thereinto over a 15 minute period.

Coatings obtained by spraying show an outstanding antireflective effect as determined according to ASTM-D 1003. The following values were observed:

$T_D = 2.2–6.8$; $T_2 = 93.5$.

EXAMPLES 2-7

Following the procedure of Example 1, coatings of UV-hardening compositions were prepared from the following monomers and benzildimethylketal (to give 100 percent by weight):

Example 2. Glycerol triacrylate (40 percent) and pentaerythritol tetraacrylate (55 percent);

Example 3. Glycerol triacrylate (36 percent) and trimethylolpropane triacrylate (60 percent);

Example 4. Ditrimethylolpropane tetraacrylate (55 percent) and glycol dimethacrylate (40 percent);

Example 5. Diglycerol tetraacrylate (70 percent) and glycerine triacrylate (27 percent);

Example 6. Dipentaerythritol hexaacrylate (40 percent), trimethylolethane triacrylate (40 percent), and cyclohexylmethacrylate (15 percent);

Example 7. Pentaerythritol tetramethacrylate (60 percent), ditrimethylolethane tetraacrylate (25 percent), and butylmethacrylate (10 percent).

EXAMPLE 8

(a) Batch preparation 25 g of amorphous silicic acid (as in Example 1) are dispersed in 100 g of the silicone resin coating solution described in Example 1, by means of a dissolver.

(b) Antireflective silicone resin coating solution

The solution described above in (a) is diluted with

33% of 1-hexanol,
17% of 1-butanol, and
17% of 2-propanol and 1.5 percent of the batch of silicic acid described under (a) is then stirred into it over a period of 15 min.

The coating solution so obtained is then applied to previously cleaned PMMA plates by means of a spray gun. After 10 min. air drying, the coating is cured for 4 hr. at 110° C. The coatings obtained exhibit excellent antireflective properties, firmly adhere to the substrate, and are scratch resistant.

EXAMPLE 9

Preparation of a Silicon Resin Coating Solution From Ethyltriethoxysilane 1078 g of ethyltriethoxysilane are hydrolyzed with 454 g of water and 50 g of glacial acetic acid while keeping the temperature below 50° C. After ¾-hour, 865 g of an ethanol/water mixture are removed under vacuum and the residue is diluted with 555 g of isopropyl alcohol and 57 g of toluol. 6.3 g of zinc octoate are added as a hardening catalyst. The pH is adjusted by the addition of 25 g of 3.5 percent methanolic KOH solution and 75 g propionamide. Finally, the water content is brought to 13 percent.

EXAMPLE 10

A silicon resin coating solution is prepared by hydrolyzing 960 g of methyltriethoxysilane and 40 g of tetraethoxysilane with 454 g of water and 50 g of glacial acetic acid. The temperature is kept below 50° C. After ¾-hour, 873 g of ethanol/water mixture are removed under vacuum and the residue is diluted with 560 g of isopropyl alcohol and 57 g of toluol. 6.7 g of zinc actoate were added as a hardening catalyst. 25 g of 3.5 percent methanolic KOH solution and 75 g of propionamide were added to adjust the pH. The water content was then brought to 13 percent.

EXAMPLE 11

(a) Batch preparation 16 g of amorphous silicic acid as in Example 1 are dispersed by means of a dissolver. 75 percent by weight solution of melamine resin in a solvent mixture of 12 percent (by volume) of CH₃OH, 24 percent (by volume) of toluene, 53 percent (by volume) of n-butanol, 9 percent (by volume) of glycol, 0.5 percent (by volume) of ethylene glycol acetate, and 1.5 percent (by volume) of water, for example, product "RR 2540" of Bayer AG.

(b) Antireflective melamine resin coating composition 0.8 percent of the batch described under (a) is incorporated over a period of 30 minutes into the melamine resin solution described above with which 1.5 percent of a curing agent (toluenesulfonic anhydride) has been admixed. The coating composition so obtained is applied to previously cleaned polycarbonate plates by means of a spray gun. After about 20 minutes drying at 125° C., firmly adhering scratch resistant coatings possessing excellent antireflective properties are obtained.

In the foregoing Examples, the refractive index of the coatings produced, determined according to DIN 53491, always differs by more than 0.01 unit from a value of 1.45.

What is claimed is:

1. A scratch resistant antireflecting coating having a refractive index differing from the value 1.45 by at least 0.01, said coating comprising a matrix film, from 1 to 40 microns thick, of
   (1) (a) an acrylate and/or methacrylate polymer, and/or
   (b) an organosilicon polymer, or
   (c) a melamine resin; and, in said matrix film,
   (2) from 0.1 to 10 percent, by weight of the coating, of amorphous, porous silica having a large pore volume from 0.1 to 5 ml/g and consisting of primary particles having an average diameter from 1 to 50 microns, at least 40 percent of the silica primary particles having an average diameter at least 10 percent greater than the thickness of the matrix film.

2. A coating as in claim 1 wherein the packed density of said silica is from 120 to 350 g/l.

3. A coating as in claim 1 wherein said silica primary particles have an average diameter from 1 to 20 microns.

4. A coating as in claim 1 wherein said silica has a specific surface area from 300 to 900 m²/g.

5. A coating as in claim 1 wherein at least 50 percent of the silica primary particles have an average diameter at least 15 percent greater than the thickness of the coating.

6. A synthetic resin substrate having thereon a scratch resistant antireflecting coating as in claim 1.

7. A coated substrate as in claim 6 wherein said synthetic resin is transparent.

8. A coated substrate as in claim 7 wherein said synthetic resin is a polymer of methyl methacrylate.

9. A coating as in claim 1 wherein said polymer (1) (a) is crosslinked by the presence therein of 40 to 100 percent by weight of diacrylate and/or dimethacrylate esters.

10. A coating as in claim 1 comprising (b) an organosilicon polymer.

11. A coating as in claim 1 comprising (c) a melamine resin.

* * * * *